US012026722B2

(12) United States Patent
Zheng et al.

(10) Patent No.: US 12,026,722 B2
(45) Date of Patent: Jul. 2, 2024

(54) INFORMATION READING SYSTEM AND METHOD

(71) Applicant: BYD COMPANY LIMITED, Shenzhen (CN)

(72) Inventors: Zhiyong Zheng, Shenzhen (CN); Zhen Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 281 days.

(21) Appl. No.: 17/764,321

(22) PCT Filed: Sep. 25, 2020

(86) PCT No.: PCT/CN2020/117833
§ 371 (c)(1),
(2) Date: Mar. 28, 2022

(87) PCT Pub. No.: WO2021/057914
PCT Pub. Date: Apr. 1, 2021

(65) Prior Publication Data
US 2022/0343340 A1  Oct. 27, 2022

(30) Foreign Application Priority Data
Sep. 29, 2019 (CN) .......................... 201910939365.3

(51) Int. Cl.
*G06K 5/00* (2006.01)
*A24F 40/10* (2020.01)
(Continued)

(52) U.S. Cl.
CPC .......... *G06Q 30/0185* (2013.01); *A24F 40/10* (2020.01); *A24F 40/40* (2020.01); *A24F 40/53* (2020.01)

(58) Field of Classification Search
CPC .......... A24F 40/10; A24F 40/50; A24F 40/53; A24F 40/42; A24F 40/20; A24F 40/40; G06Q 30/0185
(Continued)

(56) References Cited

U.S. PATENT DOCUMENTS 10,671,031 B2 *  6/2020  Hawes .................... G05B 15/02
10,701,981 B2 *  7/2020  Newcomb ................ H05B 3/03
(Continued)

FOREIGN PATENT DOCUMENTS

CN  103473193 B  8/2016
CN  105011378 B  7/2018
(Continued)

OTHER PUBLICATIONS

The World Intellectual Property Organization (WIPO) International Search Report for PCT/CN2020/117833 dated Dec. 21, 2020 4 pages (with translation).

*Primary Examiner* — Daniel St Cyr
(74) *Attorney, Agent, or Firm* — Wenye Tan

(57) ABSTRACT

An information reading system includes an information reading device and a device-to-be-identified. The information reading device includes a first signal pin, a second signal pin, and a control module, and the device-to-be-identified includes a third signal pin and a ground pin. The control module is configured to, when recognizing that the device-to-be-identified is inserted, control the first signal pin to connect to the third signal pin of the device-to-be-identified, and control the second signal pin to connect to the ground pin, to form a first single-wire path, and attempt to read anti-counterfeiting information stored in the device-to-be-identified by using the first single-wire path.

5 Claims, 3 Drawing Sheets

(51) Int. Cl.
*A24F 40/40* (2020.01)
*A24F 40/53* (2020.01)
*G06Q 30/018* (2023.01)

(58) Field of Classification Search
USPC .......................................... 235/380, 382, 385
See application file for complete search history.

(56) References Cited

U.S. PATENT DOCUMENTS

| | | | |
|---|---|---|---|
| 2017/0038810 A1 | 2/2017 | Ueki | |
| 2017/0042246 A1 | 2/2017 | Lau et al. | |
| 2017/0043999 A1* | 2/2017 | Murison | B67D 7/145 |
| 2018/0060873 A1 | 3/2018 | Chu | |
| 2018/0132530 A1 | 5/2018 | Rogers et al. | |
| 2019/0158938 A1* | 5/2019 | Bowen | A61M 11/042 |

FOREIGN PATENT DOCUMENTS

| | | |
|---|---|---|
| CN | 109198724 A | 1/2019 |
| CN | 109247623 A | 1/2019 |
| CN | 107665177 B | 7/2019 |
| CN | 110169597 A | 8/2019 |

\* cited by examiner

INFORMATION READING SYSTEM AND METHOD

CROSS-REFERENCE TO RELATED APPLICATIONS

This application is a national stage entry under 35 U.S.C. § 371 of International Application No. PCT/CN2020/117833, filed on Sep. 25, 2020, which claims priority to Chinese Patent Application No. 201910939365.3, entitled "INFORMATION READING SYSTEM AND METHOD" and filed on Sep. 29, 2019, the entire contents of all of which are incorporated herein by reference.

FIELD

The present disclosure relates to the field of automatic control technologies, and in particular, to an information reading system and method.

BACKGROUND

An electronic cigarette generally includes a tobacco rod and a cartridge, and the cartridge is a container for holding e-liquid. After the cartridge is inserted into the tobacco rod, nicotine and perfume are vaporized by heating the e-liquid, so that a user experiences the same mouthfeel and flavor as those of inhaling real cigarettes. Currently, electronic cigarettes on the market cannot recognize whether a cartridge meets use requirements, making it impossible to effectively supervise cartridges of different quality and leading to relatively poor user experience.

SUMMARY

The present disclosure provides an information reading system and method, which can effectively improve an information reading speed between detachable components and reduce the complexity of information reading.

According to a first aspect, an embodiment of the present disclosure provides an information reading system, including an information reading device and a device-to-be-identified, the information reading device including a first signal pin, a second signal pin, and a control module, the device-to-be-identified including a third signal pin and a ground pin. The control module is configured to: when recognizing that the device-to-be-identified is inserted, control the first signal pin to connect to the third signal pin of the device-to-be-identified, and control the second signal pin to connect to the ground pin of the device-to-be-identified, to form a first single-wire path by using the first signal pin, the second signal pin, the third signal pin, and the ground pin; attempt to read anti-counterfeiting information stored in the device-to-be-identified by using the first single-wire path; when the anti-counterfeiting information fails to be read, control the first signal pin to connect to the ground pin of the device-to-be-identified, and control the second signal pin to connect to the third signal pin of the device-to-be-identified, to form a second single-wire path by using the first signal pin, the second signal pin, the third signal pin, and the ground pin; and first supply power to the device-to-be-identified by using the second single-wire path, and then attempt to read the anti-counterfeiting information stored in the device-to-be-identified by using the second single-wire path.

According to a second aspect, an embodiment of the present disclosure provides an information reading method, applicable to an information reading system, the information reading system including an information reading device and a device-to-be-identified, the information reading device including a first signal pin, a second signal pin, and a control module, the device-to-be-identified including a third signal pin and a ground pin, the method including: when recognizing that the device-to-be-identified is inserted, controlling the first signal pin to connect to the third signal pin of the device-to-be-identified, and controlling the second signal pin to connect to the ground pin of the device-to-be-identified, to form a first single-wire path by using the first signal pin, the second signal pin, the third signal pin, and the ground pin; first supplying power to the device-to-be-identified by using the first single-wire path; attempting to read anti-counterfeiting information stored in the device-to-be-identified by using the first single-wire path; when the anti-counterfeiting information fails to be read, controlling the first signal pin to connect to the ground pin of the device-to-be-identified, and controlling the second signal pin to connect to the third signal pin of the device-to-be-identified, to form a second single-wire path by using the first signal pin, the second signal pin, the third signal pin, and the ground pin; and attempting to read the anti-counterfeiting information stored in the device-to-be-identified by using the second single-wire path.

According to the information reading system and method provided in the embodiments of the present disclosure, when the device-to-be-identified is inserted into the information reading device, power is first supplied to the device-to-be-identified by using a single-wire path constructed according to the Single Wire Protocol, and the anti-counterfeiting information stored in the device-to-be-identified is then automatically read. In this way, then authentication of the device-to-be-identified is implemented, and a simple and efficient recognition manner of the device-to-be-identified effectively improves the security and timeliness of obtaining the anti-counterfeiting information of the device-to-be-identified and improves user experience.

BRIEF DESCRIPTION OF THE DRAWINGS

Other features, objectives, and advantages of the present disclosure become more obvious by reading the detailed description of non-limiting embodiments that is provided with reference to the following accompanying drawings.

DETAILED DESCRIPTION

The present disclosure is further described in detail below with reference to the accompanying drawings and embodiments. It may be understood that specific embodiments described herein are only used to explain related disclosure, but not to limit the disclosure. In addition, it should be further noted that, for ease of description, the accompanying drawings only show parts relevant to the present disclosure.

It should be noted that, the embodiments in the present disclosure and features in the embodiments may be mutually combined in case that no conflict occurs. The present disclosure is described in detail below with reference to the accompanying drawings and the embodiments.

Figure 1:
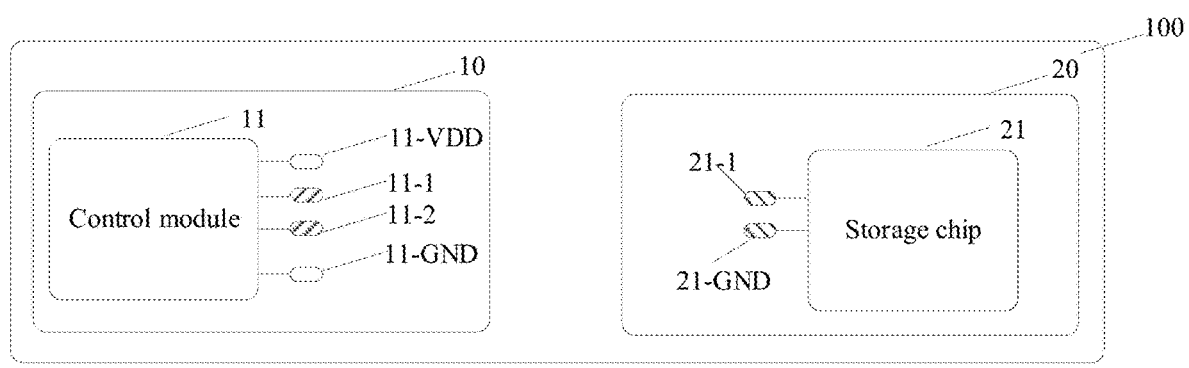
FIG. 1 is a schematic structural diagram of an information reading system according to an embodiment of the present disclosure.

An embodiment of the present disclosure provides an information reading system, and anti-counterfeiting information can be automatically read by using the system, so that the authenticity of a device-to-be-identified is quickly determined. FIG. 1 is a schematic structural diagram of an information reading system according to an embodiment of the present disclosure. The information reading system 100 includes an information reading device 10 and a device-to-be-identified 20.

The information reading device 10 includes a plurality of pins and a control module 11, and the plurality of pins may include a first signal pin 11-1 and a second signal pin 11-2. The plurality of pins and the control module 11 of the information reading device 10 can be implemented by using a single-chip microcomputer or a control chip, and the plurality of pins may further include a pin 11-VDD used as a power supply terminal and a pin 11-GND used as a ground terminal. To distinguish from a ground pin of the device-to-be-identified 20, a ground pin of the information reading device 10 is marked as 11-GND. The first signal pin 11-1 and the second signal pin 11-2 are both signal pins and are used for being connected to a third signal pin 21-1 and a ground pin 21-GND of the device-to-be-identified 20.

The control module 11 is configured to send a control instruction for controlling a pin to be switched on or off, and is further configured to identify the authenticity of the device-to-be-identified 20 based on information read from the device-to-be-identified 20 and control normal operation of the device-to-be-identified 20 when the device-to-be-identified 20 is genuine.

When recognizing that the device-to-be-identified 20 is inserted into the information reading device 10, the control module 11 controls the first signal pin 11-1 and the second signal pin 11-2 to simulate an insertion state of the device-to-be-identified 20, to establish a single-wire path between the information reading device 10 and the device-to-be-identified 20.

The device-to-be-identified 20 includes a storage chip 21, and the storage chip 21 is configured to store anti-counterfeiting information of the device-to-be-identified. The pin 21-1 of the storage chip 21 is the third signal pin, and the pin 21-GND is the ground pin.

When recognizing, under control of the control module 11, that the device-to-be-identified 20 is inserted, the information reading device 10 first simulates a first insertion state (which is assumed as forward insertion) of the device-to-be-identified 20. That is, the third signal pin 21-1 of the device-to-be-identified 20 is connected to the first signal pin 11-1 of the information reading device 10, the ground pin 21-GND of the device-to-be-identified 20 is connected to the second signal pin 11-2 of the information reading device 10, and the control module 11 controls the second signal pin 11-2 to be a dummy ground pin. A single-wire path is established between the information reading device 10 and the device-to-be-identified 20 according to the Single Wire Protocol, power is first supplied to the device-to-be-identified 20 by using the single-wire path, and the anti-counterfeiting information of the device-to-be-identified 20 is then automatically read by using the same single-wire path. When the anti-counterfeiting information is read, a read success is prompted.

If the anti-counterfeiting information fails to be read from the device-to-be-identified 20 according to the first insertion state, the control module 11 controls the first signal pin 11-1 and the second signal pin 11-2 to simulate a second insertion state of the device-to-be-identified 20, to establish a single-wire path between the information reading device 10 and the device-to-be-identified 20.

That is, the third signal pin 21-1 of the device-to-be-identified 20 is connected to the second signal pin 11-2 of the information reading device 10, the ground pin 21-GND of the device-to-be-identified 20 is connected to the first signal pin 11-1 of the information reading device 10, and the control module 11 controls the first signal pin 11-1 to be a dummy ground pin. A single-wire path is established between the information reading device 10 and the device-to-be-identified 20 according to the Single Wire Protocol, power is first supplied to the device-to-be-identified 20 by using the single-wire path, and the anti-counterfeiting information of the device-to-be-identified 20 is then automatically read by using the same single-wire path. When the anti-counterfeiting information is read, a read success is prompted.

The foregoing information reading system may be an electronic cigarette system or a system formed by a mobile electronic product and an accessory product. For example, the accessory product may be a charger, a charging wire or an earphone. The foregoing information reading system may be alternatively a system formed by a main device of medical equipment and a detachable component of the main device. For example, the accessory product may be a nuclear magnetic resonance device and various coils used with the device.

In this embodiment of the present disclosure, a single-wire path is established between the information reading device 10 and the device-to-be-identified 20, power is supplied to the device-to-be-identified 20 by using the single-wire path, and the anti-counterfeiting information stored in the device-to-be-identified 20 is read by using the single-wire path, which effectively improves the reading efficiency and reduces costs.

Figure 2:
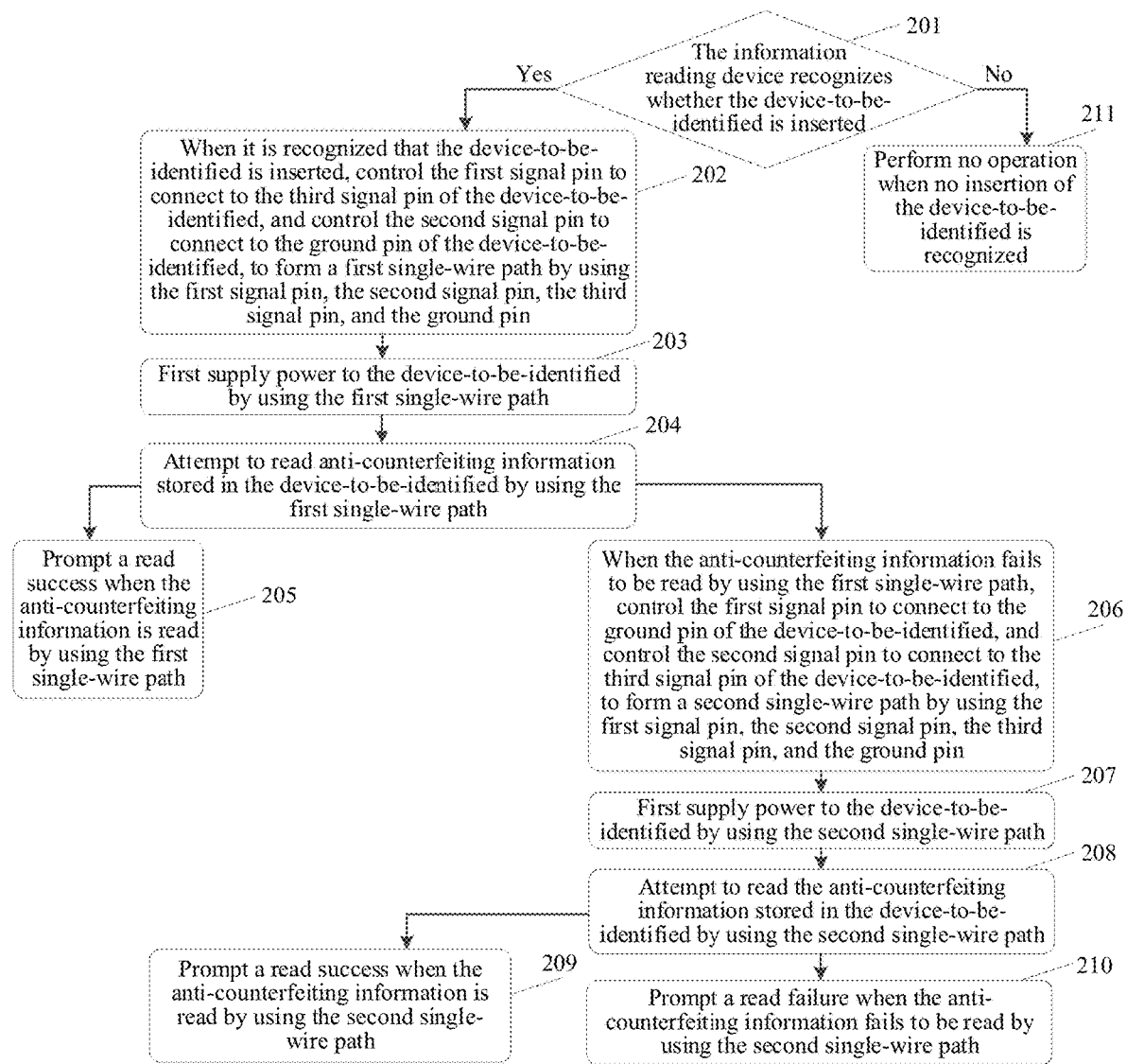
FIG. 2 is a schematic flowchart of an information reading method according to an embodiment of the present disclosure.

Further, based on the foregoing information reading system, the present disclosure further provides an information reading method with reference to FIG. 2. FIG. 2 is a schematic flowchart of an information reading method according to an embodiment of the present disclosure. As shown in FIG. 2, the method includes the following steps:

Step 201: The information reading device recognizes whether the device-to-be-identified is inserted.

Step 202: When it is recognized that the device-to-be-identified is inserted, control the first signal pin to connect to the third signal pin of the device-to-be-identified, and control the second signal pin to connect to the ground pin of the device-to-be-identified, to form a first single-wire path by using the first signal pin, the second signal pin, the third signal pin, and the ground pin.

Step 203: First supply power to the device-to-be-identified by using the first single-wire path.

Step 204: Attempt to read anti-counterfeiting information stored in the device-to-be-identified by using the first single-wire path.

Step 205: Prompt a read success when the anti-counterfeiting information is read by using the first single-wire path.

Step 206: When the anti-counterfeiting information fails to be read by using the first single-wire path, control the first signal pin to connect to the ground pin of the device-to-be-identified, and control the second signal pin to connect to the third signal pin of the device-to-be-identified, to form a second single-wire path by using the first signal pin, the second signal pin, the third signal pin, and the ground pin.

Step 207: First supply power to the device-to-be-identified by using the second single-wire path.

Step 208: Attempt to read the anti-counterfeiting information stored in the device-to-be-identified by using the second single-wire path.

Step 209: Prompt a read success when the anti-counterfeiting information is read by using the second single-wire path.

Step 210: Prompt a read failure when the anti-counterfeiting information fails to be read by using the second single-wire path.

Step 211: Perform no operation when no insertion of the device-to-be-identified is recognized.

In this embodiment of the present disclosure, an attempt is made to supply power to the device-to-be-identified according to a default single-wire mode, to read the anti-counterfeiting information from the device-to-be-identified. When the anti-counterfeiting information in the device-to-be-identified fails to be read in the default single-wire mode, a connection manner of the single-wire mode is changed, and an attempt is made again to read the anti-counterfeiting information from the device-to-be-identified. If the reading succeeds, the anti-counterfeiting information is authenticated to determine the authenticity of the device-to-be-identified, to ensure user experience. If the reading fails, an alarm is raised to prompt a user that the device-to-be-identified cannot be used. A prompt manner may be, for example, flashing a signal lamp or changing the color of a signal lamp. Alternatively, an alarm prompt may be sent to a third-party electronic device to record the anti-counterfeiting information.

The first single-wire path is a connection manner of pins when the information reading device simulates insertion of the device-to-be-identified, so that a single-wire path is established between the information reading device and the device-to-be-identified, to attempt to read the anti-counterfeiting information stored in the device-to-be-identified. For the first single-wire path, a microcontroller unit of the information reading device controls, through a control instruction, the first signal pin to connect to the third signal pin of the device-to-be-identified, and controls the second signal pin to connect to the ground pin of the device-to-be-identified, to form the first single-wire path among the first signal pin, the second signal pin, the third signal pin, and the ground pin. Power of the information reading device is transmitted to the storage chip of the device-to-be-identified by using the first signal pin through the first single-wire path. After power is supplied, the stored anti-counterfeiting information is read from the storage chip of the device-to-be-identified by using the first single-wire path. If the reading succeeds, the microcontroller unit sends a control instruction to activate the device-to-be-identified to start working. If the reading fails, the insertion state may be backward, and the microcontroller unit triggers a new control instruction to control the first signal pin to connect to the ground pin of the device-to-be-identified and control the second signal pin to connect to the third signal pin of the device-to-be-identified, to form the second single-wire path by using the first signal pin, the second signal pin, the third signal pin, and the ground pin. Power of the information reading device is transmitted to the storage chip of the device-to-be-identified by using the second signal pin through the second single-wire path. After power is supplied, the stored anti-counterfeiting information is read from the storage chip of the device-to-be-identified by using the second single-wire path. If the reading succeeds, the microcontroller unit sends a control instruction to activate the device-to-be-identified to start working. If the reading fails, the microcontroller unit sends prompt information to prompt a read failure and stops working.

According to the information reading method provided in this embodiment of the present disclosure, a single-wire path may be established between the device-to-be-identified and the information reading device, and functions of power supplying and information reading are implemented by using the single-wire path, which effectively simplifies port settings and improves the security of data transmission.

Figure 3:
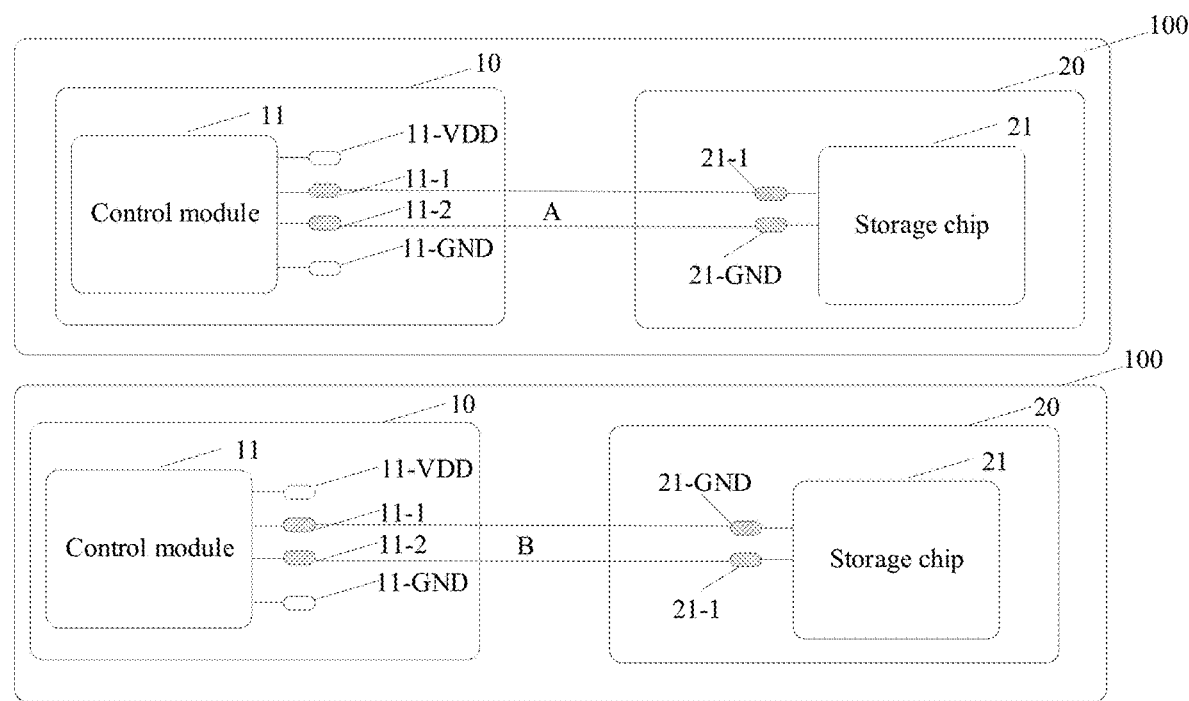
FIG. 3 is a structural principle diagram of an information reading system according to an embodiment of the present disclosure.

Based on the foregoing embodiment, FIG. 3 is a structural principle diagram of an information reading system according to an embodiment of the present disclosure.

As shown in FIG. 3, when the device-to-be-identified 20 is inserted into the information reading device 10, the control module 11 of the information reading device 10 supplies power to the device-to-be-identified 20 by using the first single-wire path and attempts to read the anti-counterfeiting information. The first single-wire path is a signal path established by the control module 11 sending a control instruction to signal pins with the signal pins of the device-to-be-identified 20 in the following manner:

A first single-wire mode is to control the first signal pin 11-1 to connect to the third signal pin 21-1 of the storage chip 21, and control the second signal pin 11-2 to connect to the ground pin 21-GND. A single-wire path A is formed among the first signal pin 11-1, the third signal pin 21-1, the ground pin 21-GND, and the second signal pin 11-2.

After power is supplied to the storage chip 21 of the device-to-be-identified 20 by using the single-wire path A, the anti-counterfeiting information stored in the storage chip 21 is read from the third signal pin 21-1 by using the single-wire path A. The storage chip 21 may be an electrically erasable programmable read-only memory (EEPROM) chip. If the device-to-be-identified is a cartridge, the anti-counterfeiting information may include information such as e-liquid flavor, nicotine salt content, a production batch, a shelf life, a product serial number, security code, encryption code, individual identification code, supplier code, manufacturer code, and a production location. If the device-to-be-identified 20 is an accessory product of another electronic product, the anti-counterfeiting information of the accessory product may be written into the storage chip 21 one by one as required, and the storage chip 21 is implanted into the accessory product.

When the device-to-be-identified 20 is inserted into the information reading device 10, the information reading device 10 can detect that the device-to-be-identified 20 is inserted. The control module 11 may then control pins to supply power to the storage chip 21 of the device-to-be-identified 20, to read the anti-counterfeiting information from the storage chip 21 through a control instruction. The control module 11 then identifies the anti-counterfeiting information.

When the anti-counterfeiting information fails to be read, the control module 11 controls connection of the pins by switching instructions, to switch from the first single-wire mode to a second single-wire mode, and then supplies power to the device-to-be-identified 20 according to the second single-wire mode and attempts to read the anti-counterfeiting information.

For example, the second single-wire mode is to control the second signal pin 11-2 to connect to the third signal pin 21-1 of the storage chip 21 and control the first signal pin 11-1 to connect to the ground pin 21-GND. A single-wire path B is formed among the first signal pin 11-1, the third signal pin 21-1, the ground pin 21-GND, and the second signal pin 11-2.

After power is supplied to the storage chip 21 of the device-to-be-identified 20 by using the single-wire path B, the anti-counterfeiting information stored in the storage chip 21 is read from the third signal pin 21-1 by using the single-wire path B. When the anti-counterfeiting information is read, a read success is prompted. When the anti-counterfeiting information fails to be read, a read error is prompted. After control switching, if the anti-counterfeiting information still fails to be read, a read error is prompted, indicating that the device-to-be-identified 20 does not match the information reading device 10.

In this embodiment of the present disclosure, a dummy ground wire is disposed in the information reading device, to implement automatic recognition of an insertion manner of the device-to-be-identified. In this case, from the perspective of a user, the user can ignore the insertion manner of the device-to-be-identified, and the information reading device can also automatically read content stored in the device-to-be-identified, thereby effectively improving the efficiency of information reading and improving user experience.

Figure 4:
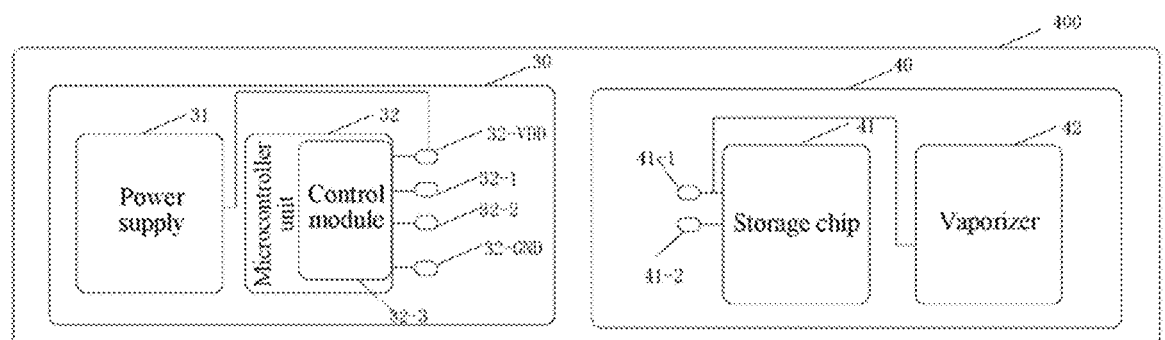
FIG. 4 is a schematic structural diagram of an electronic cigarette system according to an embodiment of the present disclosure.

The information reading method provided in the present disclosure may be also applicable to an electronic cigarette system. FIG. 4 is a schematic structural diagram of an electronic cigarette system according to an embodiment of the present disclosure.

As shown in FIG. 4, the electronic cigarette system 400 includes a tobacco rod 30 and a cartridge 40. A power supply 31 and a microcontroller unit 32 are disposed in the tobacco rod, and the microcontroller unit 32 includes a first signal pin 32-1, a second signal pin 32-2, and a control module 32-3. The microcontroller unit 32 further includes a power supply pin 32-VDD and a ground pin 32-GND.

The cartridge 40 includes a storage chip 41 and a vaporizer 42, and a third signal pin 41-1 and a ground pin 41-2 are disposed on the storage chip 41.

The control module 32-3 is configured to: when recognizing that the cartridge 40 is inserted into the tobacco rod, control the first signal pin 32-1 to connect to the third signal pin 41-1, and control the second signal pin 32-2 to connect to the ground pin 41-2, to form the first single-wire path. That is, the control module 32-3 simulates a forward insertion manner of the cartridge 40 to form a single-wire path. The forward insertion may be understood in a relative manner. That is, forward insertion is defined according to a connection manner, and a backward connection formed with pins of this connection manner is defined as backward insertion. The first signal pin 32-1 is further controlled to supply power to the storage chip 41 by using the first single-wire path. After power is supplied, anti-counterfeiting information stored in the storage chip 41 is read by using the first single-wire path.

When the anti-counterfeiting information fails to be read, the first signal pin 32-1 is controlled to connect to the ground pin 41-2, and the second signal pin 32-2 is controlled to connect to the third signal pin 41-1, to form a second single-wire path; the second signal pin 32-2 is controlled to supply power to the storage chip 41 by using the second single-wire path; and after power is supplied, the anti-counterfeiting information stored in the storage chip 41 is read by using the second single-wire path. After the anti-counterfeiting information is read, the control module 32-3 is further configured to send a control instruction to allow the vaporizer 42 to work normally when the anti-counterfeiting information is genuine; and send a control instruction to prompt an error or prohibit the vaporizer 42 from working normally when the anti-counterfeiting information is counterfeit.

In this embodiment of the present disclosure, a storage chip is implanted into a cartridge, and a control module in a tobacco rod is used to control a signal pins of the control module to simulate a connection manner between the tobacco rod and the cartridge, to form a one-way path in the tobacco rod and the cartridge. The tobacco rod uses the one-way path to attempt to supply power to the storage chip of the cartridge, and then uses the one-way path to read the anti-counterfeiting information in the storage chip. If the anti-counterfeiting information fails to be read in a simulated connection manner, another possible connection manner of the cartridge is simulated by changing the signal pins, to read the anti-counterfeiting information, and if the anti-counterfeiting information still fails to be read, the cartridge is considered as an unauthorized product and the vaporizer cannot be triggered to work.

The foregoing descriptions are merely preferred embodiments of the present disclosure and descriptions of the technical principles used. A person skilled in the art should understand that the scope of the present disclosure is not limited to the technical solutions that are formed by the foregoing particular combinations of technical features, but shall also encompass other technical solutions formed by arbitrarily combining the foregoing technical features or equivalent features thereof without departing from the foregoing concept of the present disclosure. For example, technical solutions formed by replacing the foregoing features with technical features having similar functions disclosed in the present disclosure (but not limited thereto) are also included.

What is claimed is:

1. An information reading system, comprising an information reading device and a device-to-be-identified,
the information reading device comprising a first signal pin, a second signal pin, and a control module, the device-to-be-identified comprising a third signal pin and a ground pin, wherein
the control module is configured to:
when recognizing that the device-to-be-identified is inserted, control the first signal pin to connect to the third signal pin of the device-to-be-identified, and control the second signal pin to connect to the ground pin, to form a first single-wire path; and attempt to read anti-counterfeiting information stored in the device-to-be-identified by using the first single-wire path;
when the anti-counterfeiting information fails to be read, control the first signal pin to connect to the ground pin, and control the second signal pin to connect to the third signal pin, to form a second single-wire path; and attempt to read the anti-counterfeiting information stored in the device-to-be-identified by using the second single-wire path.

2. The information reading system according to claim 1, wherein before attempting to read the anti-counterfeiting information stored in the device-to-be-identified by using the first single-wire path or the second single-wire path, the control module is further configured to:
supply power to the device-to-be-identified by using the first single-wire path or the second single-wire path.

3. The information reading system according to claim 1, wherein the information reading system is an electronic cigarette system, the information reading device is a tobacco rod, the device-to-be-identified is a cartridge, a power supply and a microcontroller unit are disposed in the tobacco rod, and the microcontroller unit comprises the first signal pin, the second signal pin, and the control module;

the cartridge comprises a storage chip and a vaporizer, and the third signal pin and the ground pin are disposed on the storage chip;

the control module is configured to: when recognizing that the cartridge is inserted into the tobacco rod, control the first signal pin to connect to the third signal pin, and control the second signal pin to connect to the ground pin, to form the first single-wire path;

control the first signal pin to supply power to the storage chip by using the first single-wire path;

after power is supplied, read the anti-counterfeiting information stored in the storage chip by using the first single-wire path;

when the anti-counterfeiting information fails to be read, control the first signal pin to connect to the ground pin, and control the second signal pin to connect to the third signal pin, to form the second single-wire path;

control the second signal pin to supply power to the storage chip by using the second single-wire path; and after power is supplied, read the anti-counterfeiting information stored in the storage chip by using the second single-wire path; and after the anti-counterfeiting information is read, the control module is further configured to send a control instruction to allow the vaporizer to work normally when the anti-counterfeiting information is genuine.

4. An information reading method, applicable to an information reading system, the information reading system comprising an information reading device and a device-to-be-identified, the information reading device comprising a first signal pin, a second signal pin, and a control module, the device-to-be-identified comprising a third signal pin and a ground pin, the method comprising:

when recognizing that the device-to-be-identified is inserted, controlling the first signal pin to connect to the third signal pin of the device-to-be-identified, and controlling the second signal pin to connect to the ground pin of the device-to-be-identified, to form a first single-wire path by using the first signal pin, the second signal pin, the third signal pin, and the ground pin;

attempting to read anti-counterfeiting information stored in the device-to-be-identified by using the first single-wire path;

when the anti-counterfeiting information fails to be read, controlling the first signal pin to connect to the ground pin of the device-to-be-identified, and controlling the second signal pin to connect to the third signal pin of the device-to-be-identified, to form a second single-wire path by using the first signal pin, the second signal pin, the third signal pin, and the ground pin; and attempting to read the anti-counterfeiting information stored in the device-to-be-identified by using the second single-wire path.

5. The information reading method according to claim 4, wherein the information reading system is an electronic cigarette system, the information reading device is a tobacco rod, the device-to-be-identified is a cartridge, a power supply and a microcontroller unit are disposed in the tobacco rod, and the microcontroller unit comprises the first signal pin, the second signal pin, and the control module;

the cartridge comprises a storage chip and a vaporizer, and the third signal pin and the ground pin are disposed on the storage chip;

the control module is configured to: when recognizing that the cartridge is inserted into the tobacco rod, control the first signal pin to connect to the third signal pin, and control the second signal pin to connect to the ground pin, to form the first single-wire path;

control the first signal pin to supply power to the storage chip by using the first single-wire path;

after power is supplied, read the anti-counterfeiting information stored in the storage chip by using the first single-wire path; when the anti-counterfeiting information fails to be read, control the first signal pin to connect to the ground pin, and control the second signal pin to connect to the third signal pin, to form the second single-wire path;

control the second signal pin to supply power to the storage chip by using the second single-wire path; and after power is supplied, read the anti-counterfeiting information stored in the storage chip by using the second single-wire path; and after the anti-counterfeiting information is read, the control module is configured to send a control instruction to allow the vaporizer to work normally when the anti-counterfeiting information is genuine.

* * * * *